United States Patent
Chakraborty et al.

(10) Patent No.: US 10,923,109 B2
(45) Date of Patent: Feb. 16, 2021

(54) METHOD AND APPARATUS FOR TRAINING OF CONVERSATIONAL AGENTS

(71) Applicant: [24]7.ai, Inc., San Jose, CA (US)

(72) Inventors: Abir Chakraborty, Bangalore (IN); Sruti Rallapalli, Bangalore (IN); Vidhya Duthaluru, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 16 days.

(21) Appl. No.: 16/053,190

(22) Filed: Aug. 2, 2018

(65) Prior Publication Data

US 2019/0043483 A1 Feb. 7, 2019

Related U.S. Application Data

(60) Provisional application No. 62/540,364, filed on Aug. 2, 2017.

(51) Int. Cl.
*G10L 15/06* (2013.01)
*G10L 15/16* (2006.01)
(Continued)

(52) U.S. Cl.
CPC ............ *G10L 15/063* (2013.01); *G06F 40/35* (2020.01); *G06N 3/006* (2013.01); *G06N 3/0445* (2013.01);
(Continued)

(58) Field of Classification Search
CPC ....... G10L 15/063; G10L 15/16; G10L 15/22; G10L 15/265; G06F 40/35
See application file for complete search history.

(56) References Cited

U.S. PATENT DOCUMENTS 7,039,654 B1 * 5/2006 Eder ...................... G06Q 10/06
8,209,209 B2   6/2012 Minert et al.
(Continued)

FOREIGN PATENT DOCUMENTS

WO        2017092380 A1    6/2017

OTHER PUBLICATIONS

Ge, Wendong, and Bo Xu. "Dialogue management based on sentence clustering." Proceedings of the 53rd Annual Meeting of the Association for Computational Linguistics and the 7th International Joint Conference on Natural Language Processing (vol. 2: Short Papers). 2015. (Year: 2015).*

*Primary Examiner* — Paras D Shah
(74) *Attorney, Agent, or Firm* — Perkins Coie LLP; Michael Glenn

(57) ABSTRACT

A computer-implemented method and an apparatus for facilitating training of conversational agents are disclosed. The method includes automatically extracting a workflow associated with each conversation from among a plurality of conversations between agents and customers of an enterprise. The workflow is extracted, at least in part, by encoding one or more utterances associated with the respective conversation and mapping the encoded one or more utterances to predefined workflow stages. A clustering of the plurality of conversations is performed based on a similarity among respective extracted workflows. The clustering of the plurality of conversations configures a plurality of workflow groups. At least one conversational agent is trained in customer engagement using a set of conversations associated with at least one workflow group from among the plurality of workflow groups.

13 Claims, 8 Drawing Sheets

(51) Int. Cl.
  *G06N 3/08* (2006.01)
  *G10L 15/22* (2006.01)
  *H04L 12/58* (2006.01)
  *G06N 3/04* (2006.01)
  *H04M 3/493* (2006.01)
  *G06N 3/00* (2006.01)
  *G06F 40/35* (2020.01)
  *H04M 3/51* (2006.01)
  *G10L 15/26* (2006.01)
  *G06N 20/10* (2019.01)

(52) U.S. Cl.
  CPC ............ *G06N 3/0454* (2013.01); *G06N 3/08* (2013.01); *G06N 3/088* (2013.01); *G10L 15/16* (2013.01); *G10L 15/22* (2013.01); *H04L 51/02* (2013.01); *H04M 3/4936* (2013.01); *G06N 20/10* (2019.01); *G10L 15/26* (2013.01); *G10L 2015/0631* (2013.01); *H04M 3/5166* (2013.01)

(56) References Cited

U.S. PATENT DOCUMENTS

| | | |
|---|---|---|
| 9,015,046 B2 | 4/2015 | Pereg et al. |
| 9,378,202 B2 * | 6/2016 | Larcheveque ...... G10L 15/1815 |
| 2008/0276315 A1 | 11/2008 | Shuster |
| 2012/0254465 A1 | 10/2012 | Papadimitriou |
| 2014/0317030 A1 * | 10/2014 | Shen ...................... G06N 3/006 706/12 |
| 2015/0256677 A1 | 9/2015 | Konig et al. |
| 2017/0148073 A1 * | 5/2017 | Nomula ................ G06F 16/957 |
| 2018/0052664 A1 * | 2/2018 | Zhang ........................ G06F 8/34 |
| 2018/0165691 A1 * | 6/2018 | Heater ..................... G06F 40/30 |
| 2018/0218080 A1 * | 8/2018 | Krishnamurthy ............................ G06F 16/90332 |
| 2019/0019077 A1 * | 1/2019 | Griffin .................... G06F 9/453 |

\* cited by examiner

JOHN: HI ← 502
AGENT: HI JOHN, HOW CAN I HELP ← 504
YOU TODAY?
JOHN: WHEN IS MY CONTRACT ← 506
EXPIRING?

AGENT: SURE, I CAN HELP YOU WITH ← 508
THAT. PLEASE PROVIDE YOUR
PHONE NUMBER?
JOHN: ⋮
AGENT: ⋮
JOHN: CAN I RENEW MY CONTRACT ← 510
USING A DIGITAL WALLET
ACCOUNT?
AGENT: YES. DO YOU WANT TO USE ← 512
YOUR ABC DIGITAL WALLET
ACCOUNT FOR RENEWING
THE CONTRACT?
⋮
AGENT: THANK YOU JOHN FOR ← 514
CHOOSING TO RENEW YOUR
CONTRACT WITH XYZ.
GOOD DAY!

METHOD AND APPARATUS FOR TRAINING OF CONVERSATIONAL AGENTS

CROSS REFERENCE TO RELATED APPLICATIONS

This application claims priority to U.S. provisional patent application Ser. No. 62/540,364, filed Aug. 2, 2017, which is incorporated herein in its entirety by this reference thereto.

TECHNICAL FIELD

The invention generally relates to interactions between customers and agents of an enterprise, and more particularly to a method and apparatus for training of conversational agents for conducting effective interactions with customers of the enterprise.

BACKGROUND

Typically, a customer may wish to converse with a customer support representative of an enterprise to enquire about products/services of interest, to resolve concerns, to make payments, to lodge complaints, and the like. To serve such a purpose, the enterprises may deploy both, live and automated conversational agents to interact with the customers and provide them with desired assistance.

The automated conversational agents, such as chatbots, may use natural language processing algorithms and special grammar to interpret customer's natural language inputs, whether provided in a spoken form or a textual form, and respond appropriately.

Generally, the customers seeking assistance from customer support representatives may pose a variety of queries to the customer support representatives. Furthermore, queries with similar intentions may be framed differently by different customers. In many example scenarios, an automated conversational agent may be limited in its ability to provide assistance to some customers on account of a sheer variety of requests that the automated conversational agent has to interpret and thereafter accomplish tasks to service those requests.

In some example scenarios, human agents who are also referred to as live agents, may monitor responses provided by the automated conversational agents to the customers. In some cases, a live agent may override some responses provided by the automated conversational agent if better responses can be provided to a customer for assisting the customer. The frequent overriding of automated conversational agent responses may not be the most effective use of enterprise resources and further, frequent overriding of automated conversational agent responses by the live agent may cause delay in providing appropriate responses to the customers and ruin a customer service experience.

Therefore, there is a need for training of conversational agents, like the chatbots, for providing effective assistance to customers of the enterprise. Moreover, there is a need to facilitate training of the conversational agents in an automated manner, thereby precluding the need to manually interpret responses provided by the conversational agents for improving a quality of responses provided to the customers of the enterprise.

SUMMARY

In an embodiment of the invention, a computer-implemented method for facilitating training of conversational agents is disclosed. The method automatically extracts, by an apparatus, a workflow associated with each conversation from among a plurality of conversations between agents and customers of an enterprise. The workflow is extracted, at least in part, by encoding one or more utterances associated with the respective conversation and mapping the encoded one or more utterances to predefined workflow stages. The method performs, by the apparatus, a clustering of the plurality of conversations based on a similarity among respective extracted workflows. The clustering of the plurality of conversations configures a plurality of workflow groups. The method trains, by the apparatus, at least one conversational agent in customer engagement. The at least one conversational agent is trained using a set of conversations associated with at least one workflow group from among the plurality of workflow groups.

In an embodiment of the invention, an apparatus for facilitating training of conversational agents is disclosed. The apparatus includes at least one processor and a memory. The memory stores machine executable instructions therein, that when executed by the at least one processor, causes the system to automatically extract a workflow associated with each conversation from among a plurality of conversations between agents and customers of an enterprise. The workflow is extracted, at least in part, by encoding one or more utterances associated with the respective conversation and mapping the encoded one or more utterances to predefined workflow stages. The apparatus performs a clustering of the plurality of conversations based on a similarity among respective extracted workflows. The clustering of the plurality of conversations configures a plurality of workflow groups. The apparatus trains at least one conversational agent in customer engagement. The at least one conversational agent is trained using a set of conversations associated with at least one workflow group from among the plurality of workflow groups.

In an embodiment of the invention, another computer-implemented method for facilitating training of conversational agents is disclosed. The method receives, by an apparatus, a plurality of transcripts corresponding to a plurality of conversations between agents and customers of an enterprise. Each transcript includes a plurality of utterances exchanged between a conversational agent and a customer engaged in a conversation. For each transcript, the method encodes, by the apparatus, each utterance from at least one of the conversational agent and the customer to generate a hidden state representation corresponding to the respective utterance. The hidden state representation of the respective utterance is configured to retain at least a part of a context of the respective utterance. For each transcript, the method maps, by the apparatus, the hidden state representation corresponding to each encoded utterance to a workflow stage from among predefined workflow stages. The mapping is configured to facilitate automatic extraction of a workflow associated with each conversation from among the plurality of conversations. The method performs, by the apparatus, a clustering of the plurality of conversations based on a similarity among respective extracted workflows. The clustering of the plurality of conversations configures a plurality of workflow groups. The method trains, by the apparatus, at least one conversational agent in customer engagement. The at least one conversational agent is trained using a set of conversations associated with at least one workflow group from among the plurality of workflow groups.

BRIEF DESCRIPTION OF THE FIGURES

FIG. 5 shows a textual representation of an example turn-based conversation between a conversational agent and a customer for illustrating an automatic extraction of a workflow, in accordance with an embodiment of the invention;

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
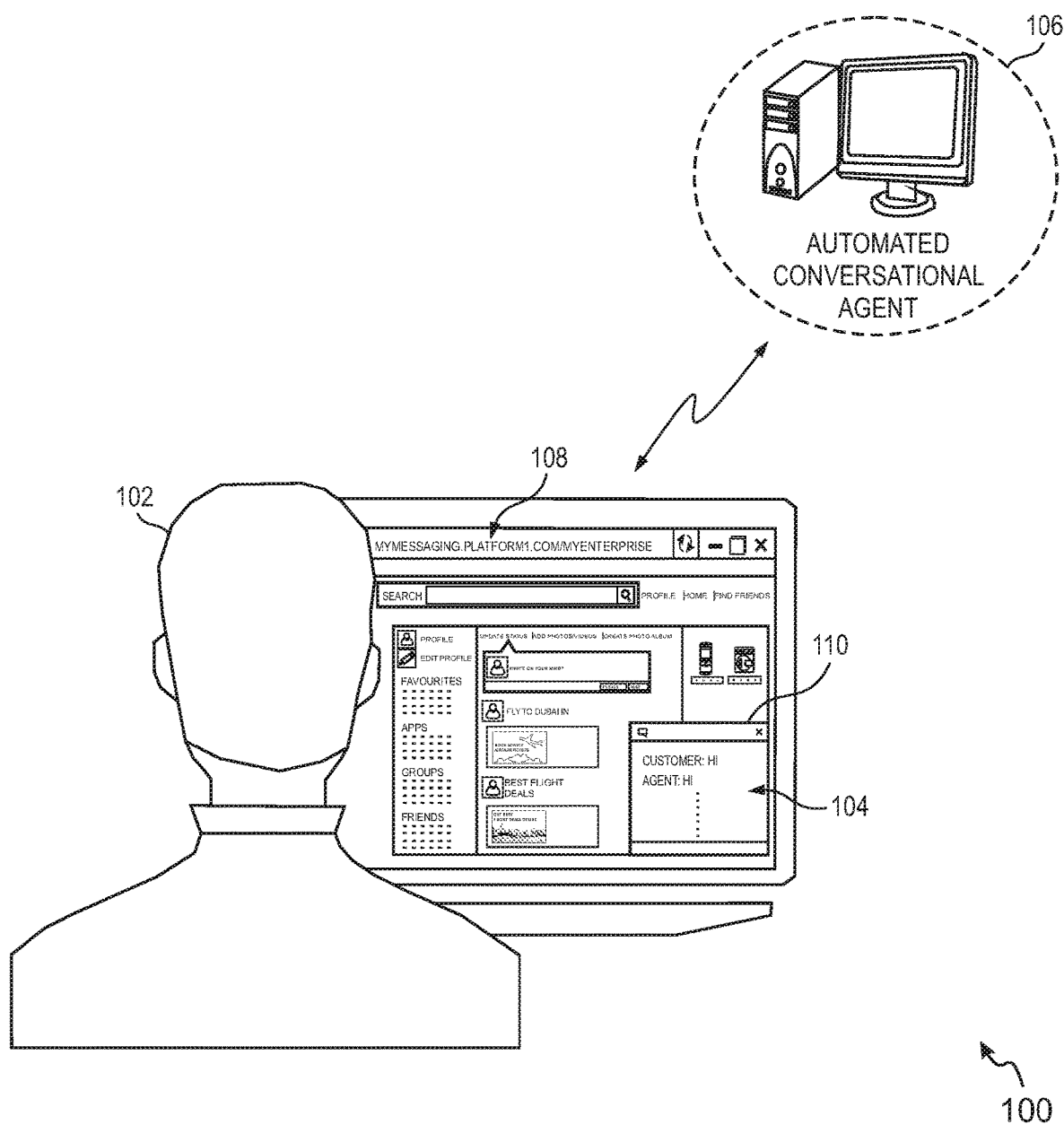
FIG. 1 shows a representation of a customer engaged in a chat conversation with an automated conversational agent, in accordance with an example scenario.

FIG. 1 shows a representation 100 of a customer 102 engaged in a chat conversation 104 with an automated conversational agent 106, in accordance with an example scenario. In an illustrative example, the customer 102 may be browsing a Website 108 of an enterprise and wish to seek assistance from a customer support representative during a current visit to the Website 108. Most enterprises typically display widgets or hyperlinks on their Website, which are associated with text such as 'Let's Chat' or 'Need Assistance, Click Here!'. The customer 102 may click on the widget or the hyperlink to seek assistance. Upon receiving an input corresponding to the widget or the hyperlink, a chat console such as a chat console 110 may be displayed to the customer 102. The customer 102 may thereafter engage in a textual chat conversation 104 with a conversational agent, such as the automated conversational agent 106, for receiving desired assistance. In some example scenarios, the customer 102 may also call a customer support number displayed on the Website 108 and connect with an automated conversational agent, such as for example an interactive voice response (IVR) system, to seek assistance therefrom. It is understood that the conversation may be embodied as a voice conversation in such a scenario. In some example scenarios, upon clicking the widget or the hyperlink, the customer 102 may be connected to a human chat agent instead of the automated conversational agent 106. Similarly, in some scenarios, upon calling the customer support number, the customer 102 may be connected to a human agent for engaging in a voice conversation. The chat or voice conversation, in such scenarios, may be conducted between the customer 102 and the human agent. The conversations between customers and conversational agents (for example, human agents and automated agents) may be stored as chat transcripts in a server associated with the customer support center for subsequent analysis and learning purposes.

Generally, the customers seeking assistance from customer support representatives may pose a variety of queries to the conversational agents. Furthermore, queries with similar intentions may be framed differently by different customers. In many example scenarios, an automated conversational agent may be limited in its ability to provide assistance to some customers on account of a variety of requests that it has to interpret and thereafter accomplish tasks to service those requests. It would be advantageous for the automated conversational agent to know beforehand a type of customer request, whether the customer query would require fetching information from a database or not, whether the conversation may require logical reasoning or may require involvement of a human agent, and the like. Currently, the conversational agents are trained in a general manner and as such are not equipped enough to handle a variety of queries.

In some example scenarios, human agents (also referred to hereinafter as 'live agents') may monitor responses provided by the automated conversational agents to the customers. In some cases, the live agents may override some responses provided by the automated conversational agents if better responses can be provided to customers for assisting the customers. As such, there is a need for training of the automated conversational agents for facilitating provisioning of effective assistance to customers of the enterprise.

Various embodiments of the present invention provide a method and apparatus that are capable of overcoming these and other obstacles and providing additional benefits. More specifically, various embodiments of the present invention disclosed herein present techniques for automatically extracting a sequence of actions or workflows from conversational transcripts and training the automated conversational agents based on the extracted workflows. The extraction of workflows enables training of the automated conversational agents to handle customer assistance requests in specific areas, thereby improving a quality of assistance provided to the customers. Moreover, the data sets created on account of extraction of workflows may enable machine-learning algorithms to better learn the sequence of actions in conversations and improve an effectiveness of responses provided to the customer. Furthermore, as the quality of responses improves, the involvement of the live agents monitoring the interactions of the automated conversational agents is also reduced. The training of conversational agents is performed in an automated manner while precluding manual interpretation of responses, thereby greatly improving an efficiency of training the automated conversational agents. An apparatus configured to facilitate training of conversational agents is shown in FIG. 2.

Figure 2:
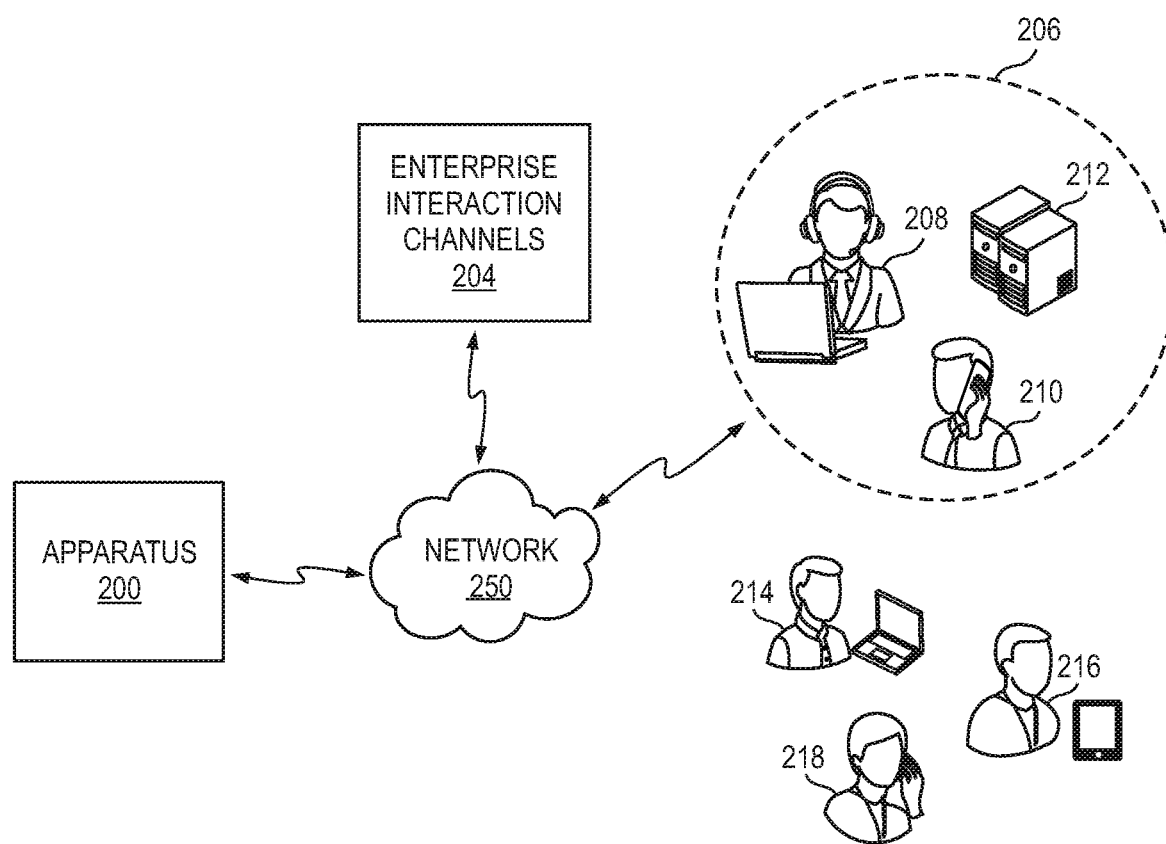
FIG. 2 is a representation showing an apparatus in operative communication with a plurality of remote entities, in accordance with an embodiment of the invention.

FIG. 2 is a representation showing an apparatus 200 in operative communication with a plurality of remote entities, in accordance with an embodiment of the invention.

In at least one example embodiment, the apparatus 200, exemplarily depicted as a block in the representation, is embodied as an interaction platform including a set of software layers on top of existing hardware systems. The apparatus 200 is configured to connect to a communication network, such as a network 250. The network 250 may be embodied as a wired communication network (for example, Ethernet, local area network (LAN), etc.), a wireless communication network (for example, a cellular network, a wireless LAN, etc.) or a combination thereof (for example, the Internet).

Using the network 250, the apparatus 200 is configured to be in operative communication with various enterprise interaction channels 204. Most enterprises, nowadays, offer various options to its customers to interact with the enterprise. For example, an enterprise may provide a website or a Web portal, i.e. a Web channel, to enable the customers to locate products/services of interest, to receive information about the products/services, to make payments, to lodge complaints, and the like. In another illustrative example, an enterprise may offer automated agents to interact with the customers and enable self-service. In yet another illustrative example, an enterprise may offer dedicated customer sales and service representatives, such as live agents, to interact with the customers by engaging in voice conversations, i.e. use a speech interaction channel, and/or chat conversations, i.e. use a chat interaction channel. Similarly, the enterprises may offer other interaction channels such as an Email channel, a social media channel, a native mobile application channel, and the like.

In the representation shown in FIG. 2, a customer support facility 206 including human resources and machine-based resources for facilitating customer interactions, is shown. The customer support facility 206 is exemplarily depicted to include two live agents 208 and 210 (who provide customers with chat-based/online assistance and voice-based assistance, respectively) and a virtual agent 212 (also referred to herein as an 'automated agent' or a 'chatbot') capable of offering customers with IVR/chat-based assistance. It is understood that the customer support facility 206 may also include other Web or digital self-assist mechanisms. Moreover, it is noted that the customer support facility 206 is depicted to include only two live agents 208 and 210 and the virtual agent 212 for illustration purposes and it is understood that the customer support facility 206 may include fewer or more number of resources than those depicted in FIG. 2.

The representation further depicts a plurality of customers, such as a customer 214, a customer 216 and a customer 218. The term 'customers' as used herein includes both existing customers as well as potential customers of information, products and services offered by the enterprise. Moreover, the term 'customer' of the enterprise may include individuals, groups of individuals, other organizational entities etc. The term 'enterprise' as used throughout the description may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. It is understood that three customers are depicted in FIG. 2 for example purposes and that the enterprise may be associated with many such customers. In some example scenarios, the customers 214, 216 and 218 may browse the Website and/or interact with the resources deployed at the customer support facility 206 over the network 250 using their respective electronic devices. Examples of such electronic devices may include mobile phones, smartphones, laptops, personal computers, tablet computers, personal digital assistants, smart watches, web-enabled wearable devices and the like.

The apparatus 200 is configured to be in operative communication with the customer support facility 206 through the network 250. More specifically, the apparatus 200 may be in operative communication with devices of live agents, with automated agents, and/or with server mechanisms monitoring the electronic devices deployed at the customer support facility 206 through the network 250. In at least one example embodiment, on account of such operative communication, the apparatus 200 may be configured to track availability of the agent in substantially real-time. Moreover, in some embodiments, the apparatus 200 may also receive transcripts of conversations between the agents and the customers in substantially real-time.

The apparatus 200 is further configured to be in operative communication with devices of the customers. For example, the apparatus 200 may be configured to be in operative communication with the enterprise native mobile applications installed in the devices of the customers and also with related applications, such as Virtual Assistants (VAs) deployed in the devices of the customers.

The apparatus 200 is configured to facilitate training of conversational agents. The term 'conversational agents' as used herein generally refers to automated conversational agents. However, it is noted that the term 'conversational agents' may also include live agents in some embodiments. Further, in some embodiments automated conversational agents configured to assist customers using the chat medium (whether a voice chat or a textual chat medium) are also referred to chatbots. Furthermore, the term 'training of conversational agents' as used herein refers to preparing (or equipping) the conversational agents to specialize in one or more areas of customer concerns so as to effectively handle all related customer requests in an appropriate and timely manner. The effecting of training of conversational agents is further explained in detail with reference to various components of the apparatus 200 in FIG. 3.

Figure 3:
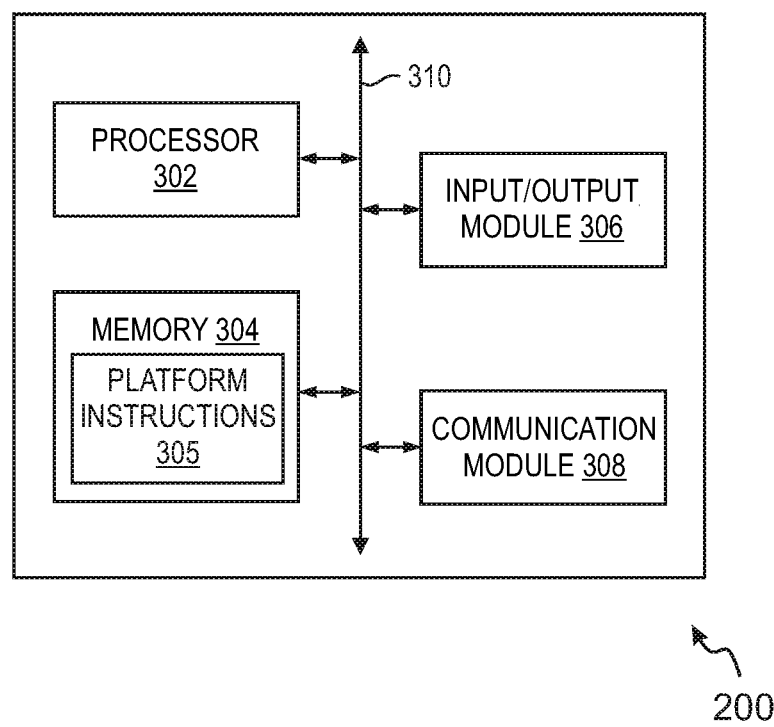
FIG. 3 is a block diagram of the apparatus of FIG. 2 configured to facilitate training of conversational agents, in accordance with an embodiment of the invention.

FIG. 3 is a block diagram of the apparatus 200 configured to facilitate training of conversational agents, in accordance with an embodiment of the invention. As explained with reference to FIG. 2, the apparatus 200 may be embodied as an interaction platform with one or more components of the apparatus 200 implemented as a set of software layers on top of existing hardware systems. The interaction platform is configured to engage in bi-directional communication with enterprise interaction channels and/or data gathering Web servers linked to the enterprise interaction channels over a communication network (such as the network 250 shown in FIG. 2). For example, the interaction platform may communicate with the data gathering Web servers to receive information related to customer interactions, such as customer chat interactions or voice interactions, in an on-going manner in real-time. Further as explained with reference to FIG. 2, the interaction platform may also be capable of engaging in operative communication with personal devices of the customers of the enterprise and configured to receive information related to customer-enterprise interactions from the personal devices of the customers.

The apparatus 200 includes at least one processor, such as a processor 302 and a memory 304. It is noted that although the apparatus 200 is depicted to include only one processor, the apparatus 200 may include more number of processors therein. In an embodiment, the memory 304 is capable of storing machine executable instructions, referred to herein as platform instructions 305. Further, the processor 302 is capable of executing the platform instructions 305. In an embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 302 may be configured to execute hard-coded functionality. In an embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

In at least some embodiments, the memory 304 is configured to store logic and instructions for facilitating conversion of voice conversations to a textual form. For example, the memory 304 may store instructions/logic for automatic speech recognition (ASR) and natural language processing techniques using special grammar to facilitate textual transcription of voice conversations. In an illustrative example, a voice conversation between an IVR (i.e. an automated conversational agent) and a customer, or, a voice conversation between a live agent and a customer may be converted to text using instructions/logic related to ASR and NLP with special grammar. It is noted that some conversations between the agents and the customers may be conducted using the chat medium and, as such, the transcripts of such conversations may be embodied in a textual form and, as such, do not require further processing for converting conversational speech to a textual form. Further, it is noted that the term 'conversations' as used throughout the description refers to interactions, whether conducted in a voice form or a textual chat form, between agents and customers of the enterprise. Furthermore, the term 'transcripts' as used throughout the description refers to textual form of conversations between agents (for example, live or virtual agents) and customers of the enterprise. As explained above, the conversations conducted in voice form may be converted to a textual form to configure corresponding transcripts, whereas the textual content of the conversations conducted in the chat form may directly be treated as transcripts for the corresponding conversations. It is noted that the term 'transcripts' is also interchangeably referred to as 'conversational transcripts' or 'chat (i.e. voice chat or text chat) transcripts' throughout the description.

The memory 304 also stores instructions related to Recurrent Neural Network (RNN) models capable of facilitating RNN based encoding and decoding of utterances associated with the conversations. Some non-limiting examples of such RNN models include, but are not limited to, Long Short-Term Memory (LSTM), Gated Recurrent Unit (GRU) and Bi-directional RNN. It is noted that an RNN model trained using encoding logic, in effect, configures an RNN based encoder, whereas an RNN model trained using decoding logic, in effect, configures an RNN based decoder.

The memory 304 further stores at least one clustering algorithm from among K-means algorithm, a self-organizing map (SOM) based algorithm, a self-organizing feature map (SOFM) based algorithm, a density-based spatial clustering algorithm, an optics clustering based algorithm and the like, for facilitating clustering of conversations as will be explained in further detail later. Furthermore, the memory 304 may also store instructions for computing similarity or dissimilarity between vector representations. For example, the memory 304 may store instructions related to computation of dissimilarity measures such as optimal matching, longest common subsequence, longest common prefix, hamming distance, and the like.

The memory 304 may also be configured to store text mining and intention prediction models as classifiers. Some examples of classifiers include models based on Logistic Regression (LR), Artificial Neural Network (ANN), Support Vector Machine (SVM) with Platt scaling, and the like. The classifiers may be used to predict intention of each customer for requesting an interaction with the agent.

In at least some embodiments, the memory 304 may include a database (not shown in FIG. 3) configured to store raw data related to conversations between agents and customers. The database may also store transcripts corresponding to the stored conversations. Further, the database may store information related to workflows extracted from conversations and the workflow groups associated with conversations, which are clustered or categorized based on similarity in associated workflows.

The apparatus 200 also includes an input/output module 306 (hereinafter referred to as 'I/O module 306') and at least one communication module such as a communication module 308. The I/O module 306 includes mechanisms configured to receive inputs from and provide outputs to the user of the apparatus 200. The term 'user of the apparatus 200' as used herein refers to any individual or groups of individuals assigned with operating the apparatus 200 for facilitating interactions between agents and customers of the enterprise. In an illustrative example, an enterprise may employ several data scientists, Machine Learning (ML) and/or Artificial Intelligence (AI) analysts, Information Technology (IT) professionals, scientists and researchers for configuring and operating the apparatus 200 embodied as an interaction platform. In an illustrative example, the I/O module 306 may enable the user of the apparatus 200 to define various workflow stages to facilitate automatic extraction of workflows from the conversations. In another illustrative example, the I/O module 306 may enable the user of the apparatus 200 to feed/input information related to agents, such as agent domain specialization for instance, to enable routing of interaction requests from customers to appropriate agents within a customer support facility. To provide such inputs and view corresponding outputs, the I/O module 306 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 302 may include I/O circuitry configured to control at least some functions of one or more elements of the I/O module 306, such as, for example, a speaker, a microphone, a display, and/or the like. The processor 302 and/or the I/O circuitry may be configured to control one or more functions of the one or more elements of the I/O module 306 through computer program instructions, for example, software and/or firmware, stored on a memory, for example, the memory 304, and/or the like, accessible to the processor 302.

The communication module 308 is configured to facilitate communication between the apparatus 200 and one or more remote entities over a communication network, such as the network 250 explained with reference to FIG. 2. For example, the communication module 308 may enable communication between the apparatus 200 and customer support facilities, such as the customer support facility 206 shown in FIG. 2. In an illustrative example, the communication module 308 receives information related to voice or chat interactions between customers and conversational agents (for example, automated conversational agents or live agents) being conducted using various interaction channels, in real-time and provide the information to the processor 302.

To that effect, the communication module 308 may include several channel interfaces to receive information from a plurality of enterprise interaction channels. In at least some embodiments, the communication module 308 may include relevant Application Programming Interfaces (APIs) to communicate with remote data gathering servers associated with such enterprise interaction channels over the network 250. Each channel interface may further be associated with a respective communication circuitry such as for example, a transceiver circuitry including antenna and other communication media interfaces to connect to the network 250. The communication circuitry associated with each channel interface may, in at least some example embodiments, enable transmission of data signals and/or reception of signals from remote network entities, such as Web servers hosting enterprise Website or a server at a customer support facility configured to maintain real-time information related to interactions between customers and conversational agents.

In some embodiments, the information may also be collated from the plurality of devices utilized by the customers. To that effect, the communication module 308 may be in operative communication with various customer touch points, such as electronic devices associated with the customers, Websites visited by the customers, devices used by customer support representatives (for example, voice agents, chat agents, IVR systems, in-store agents, and the like) engaged by the customers and the like. In an embodiment, the customer information extracted from various customer touch points includes profile data and journey data corresponding to the respective customer. The profile data may include profile information related to the customer, such as for example, a customer's name and contact details, information related to products and services associated with the customer, social media account information, information related to other messaging or sharing platforms used by the customer, recent transactions, customer interests and preferences, customer's credit history, history of bill payments, credit score, memberships, history of travel, and the like. In some exemplary embodiments, the customer information may also include calendar information associated with the customer. For example, the calendar information may include information related to an availability of the customer during the duration of the day/week/month.

In an embodiment, journey data received corresponding to the customer may include information such as enterprise related Web pages visited, queries entered, chat entries, purchases made, exit points from websites visited, or decisions made, mobile screens touched, work flow steps completed, sequence of steps taken, engagement time, IVR speech nodes touched, IVR prompts heard, widgets/screens/buttons selected or clicked, historical session experience and results, customer relationship management (CRM) state and state changes, agent wrap-up notes, speech recordings/transcripts, chat transcripts, survey feedback, channels touched/used, sequence of channels touched/used, instructions, information, answers, actions given/performed by either enterprise system or agents for the customer, and the like. In some example scenarios, the journey data may include information related to past interactions of the customer with resources at a customer support facility, the types of channels used for interactions, customer channel preferences, types of customer issues involved, whether the issues were resolved or not, the frequency of interactions and the like.

The channel interfaces of the communication module 308 may be configured to receive such information related to the customers in real-time or on a periodic basis. Moreover, the information may be received by the communication module 308 in an online mode or an offline mode. In an embodiment, the communication module 308 provides the received information to the database in the memory 304 for storage purposes. In an embodiment, the information related to each customer is labeled with some customer identification information (for example, a customer name, a unique ID and the like) prior to storing the information in the database.

In an embodiment, various components of the apparatus 200, such as the processor 302, the memory 304, the I/O module 306 and the communication module 308 are configured to communicate with each other via or through a centralized circuit system 310. The centralized circuit system 310 may be various devices configured to, among other things, provide or enable communication between the components (302-308) of the apparatus 200. In certain embodiments, the centralized circuit system 310 may be a central printed circuit board (PCB) such as a motherboard, a main board, a system board, or a logic board. The centralized circuit system 310 may also, or alternatively, include other printed circuit assemblies (PCAs) or communication channel media.

It is noted that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. In an embodiment, one or more components of the apparatus 200 may be deployed in a Web Server. In another embodiment, the apparatus 200 may be a standalone component in a remote machine connected to a communication network and capable of executing a set of instructions (sequential and/or otherwise) to facilitate training of conversational agents of an enterprise. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as customers' devices. In another embodiment, the apparatus 200 may be a central system that is shared by or accessible to each of such devices.

In at least one example embodiment, the processor 302 in conjunction with the instructions in the memory 304, is configured to cause the apparatus 200 to automatically extract a workflow associated with each conversation from among a plurality of conversations between agents and customers of an enterprise. As explained above, the term 'conversation' as used herein may correspond to a chat interaction or a voice interaction between a conversational agent and a customer of the enterprise. The conversational agent may be a live agent (i.e. a human agent) or an automated agent (for example, a chatbot or an IVR system). As explained with reference to FIG. 1, the customers may seek interaction with agents for several reasons. The interactions (i.e. conversations) between the agents and the customers may be conducted over a chat medium or a voice medium. The content of the conversation may be transcribed to generate transcripts (i.e. textual form of content). Accordingly, a plurality of transcripts may be generated corresponding to a plurality of conversations between agents and customers of an enterprise. For purposes of this description, the term 'plurality of conversations' as used herein implies any number of conversations conducted within a predefined period (for example, a week, a month, a year and so on and so forth). In an illustrative example, the user of the apparatus 200 may decide to choose conversations conducted within the last three months as content material for training conversational agents. Accordingly, the plurality of conversations, in such a case, may imply all conversations conducted within the specified three-month period.

Each conversation from among the plurality of conversations may be associated with a sequence of actions. For example, the conversation may include a greeting stage, a stage where the agent requests information from the customer, a stage where the agent fetches information from a database, and the like. These stages (or steps/actions) associated with a conversation are referred to herein as 'workflow stages' and taken together may configure a 'workflow' associated with the respective conversation. In at least one embodiment, the processor 302 is configured to automatically extract a workflow associated with each conversation from among the plurality of conversations. The automatic extraction of the workflow is explained in detail later.

In at least one example embodiment, the processor 302 in conjunction with the instructions stored in the memory 304, is configured to cause the apparatus 200 to perform clustering of the plurality of conversations based on a similarity among respective extracted workflows. More specifically, all conversations with substantially similar workflows may be grouped together to form workflow groups. The clustering of the conversations based on a similarity of extracted workflows may configure a plurality of workflow groups. The term 'configuring workflow groups' as used herein implies that clustering or segregating conversations based on a similarity in respective workflows causes formation of several groups, which are termed as 'workflow groups' herein. Each workflow group includes a 'set of conversations', which may be a subset of the plurality of conversations on which the clustering operation was performed.

In at least one example embodiment, the processor 302 in conjunction with the instructions stored in the memory 304, is configured to train at least one conversational agent in customer engagement using a set of conversations associated with at least one workflow group. More specifically, the set of conversations in a workflow group, i.e. conversations having substantially similar workflow, may then be used to train conversational agents. The training of the conversational agent is explained in detail later.

The automatic extraction of the workflow is explained hereinafter.

In one embodiment, the processor 302 of the apparatus 200 receives a transcript corresponding to each conversation from among the plurality of conversations. As explained above, the communication module 308 is configured to be in operative communication with data gathering Web servers deployed at customer support facilities to receive up-to-date information corresponding to customer-agent interactions. The conversations between customers and conversational agents may be recorded and sent by the Web/Data gathering servers to the communication module 308. The communication module 308 may be configured to relay the information to the processor 302.

In some embodiments, the conversations are conducted in textual form and, as such, the transcripts may be received by the processor 302 in a textual form, only. However, in some cases, the conversations may be conducted in speech form and in such scenarios, the recorded voice conversations may be converted into textual form using automatic speech recognition (ASR) and natural language processing techniques using special grammar. The processor 302 may be configured to perform the said transcription of the voice conversations to generate the transcripts.

The transcript includes a plurality of utterances exchanged between a conversational agent and a customer engaged in the conversation. The term 'utterance' as used throughout the description refers to a content associated with a single 'turn' in a turn-based conversation between an agent and a customer. It is understood that the conversations between agents and customers may include several turns, i.e. the customer and agents may take turns in conversing with each other. The content of conversation (whether in typed or spoken format) associated with a single turn (either from an agent or a customer) is referred to herein as an utterance. Accordingly, a conversation between the agent and the customer may include a plurality of utterances.

In an embodiment, the processor 302 is configured to encode one or more utterances associated with the respective conversation. For example, each utterance from the conversational agent or each utterance from the customer or even a combination of utterances from the conversational agent and the customer in a single conversation may be encoded. It is noted that each utterance in the transcript is a sequence of words. Furthermore, the utterances are spoken/typed as part of a contextual dialogue, i.e. each utterance is related to a previous utterance and a subsequent utterance in a turn-based conversation. Accordingly, the processor 302 is configured to capture the context of the conversation by sequentially feeding utterances to an encoder. In at least one example embodiment, the encoder is a recurrent neural network (RNN) based encoder. The RNN based encoder is referred to hereinafter as 'RNN encoder'. Some non-limiting examples of an RNN encoder may include Long Short-Term Memory (LSTM), Gated Recurrent Unit (GRU), Bi-directional RNN, and the like.

The RNN encoder is configured to receive each word in an utterance and output a vector associated with a number, which represents a state of the encoder. As the words in an utterance are fed one after another to the RNN encoder, the current state of the encoder changes and after each word, the state of the RNN encoder is captured as a vector associated with a numerical value. It is noted that the current state of the RNN encoder at any given point of time is a result of the sequence of words that are previously provided as an input to the encoder and as such the RNN encoder maintains the context of the utterance. The output of the RNN encoder upon receiving the last word of the utterance configures a hidden state representation for the corresponding input utterance. Accordingly, a hidden state representation may be generated for each encoded utterance.

The hidden state representation represents a unique and optimal representation of the utterance subsequent to the encoding of each word in the utterance by the RNN encoder. The hidden state representation may correspond to a vector representation (a numerical value) of pre-defined user length. For example, the vector representation may include a sequence of '1's and '0's totaling a predefined number (100 or 200 binary digits for example). The vector may then be used to map the utterance to a workflow stage as will be explained hereinafter.

In at least one example embodiment, the processor 302 may be configured to, based on explicit user instructions or based on machine learning, predefine a plurality of workflow stages, such as 'information extraction', 'information passing', 'disambiguation', 'greetings', 'end of chat', and the like. The processor 302 may further be configured to map hidden state representation of each utterance to a workflow stage from among the plurality of workflow stages. The definitions of the various workflow stages and the logic for mapping a hidden state representation associated with an utterance to a workflow stage may be stored in the memory 304.

In one embodiment, a vector with a numerical value of pre-defined length which may represent an utterance, which is indicative of the utterance being a request for information or a request to disambiguate an utterance or even a request to fetch information and so on and so forth, may be generated. Further, each workflow stage may be associated with values of vectors that represent similar sentences. The processor 302 may then be configured to compare the vector representation (i.e. hidden state representation) of each encoded utterance with vector values associated with various workflow stages and identify a match, to map the encoded utterance to a workflow stage. Some non-limiting examples of metrics used to compare the vectors may include distance measuring metrics like cosine similarity, Manhattan distance, Euclidean distance, and the like. Using such metrics, the vector representing the hidden state representation of the RNN encoder may be compared with vector values of various workflow stages and a match to map the encoded utterance to the workflow stage may be identified. In an illustrative example, an utterance, where an agent greets a customer may be mapped to the 'greetings' workflow stage based on a similarity distance metric computed for comparing vector representation of the corresponding utterance and vector values associated with similar utterances representing the 'greetings' workflow stage. Similarly, an utterance where the agent is asking for specific information from the customer, such as for example a date of birth or an account number, may be mapped to the 'information extraction' workflow stage. In another illustrative example, if an agent utterance corresponds to a request for more information to understand the customer query completely, then such an utterance may be mapped to the 'disambiguation' workflow stage, and so on and so forth.

In one embodiment, each workflow stage from among the predefined workflow stages is associated with a cluster number. Accordingly, the mapping of hidden state representation to the workflow stage is configured to assign the cluster number to the hidden state representation. For example, if the 'greetings' workflow stage is assigned a cluster number 1 or $C_1$, then a mapping of an encoded utterance to the 'greetings' workflow stage may result in the corresponding utterance being tagged with $C_1$. Similarly, if the 'information extraction' workflow stage is assigned a cluster number 5 or $C_5$, then a mapping of an encoded utterance to the 'information extraction' workflow stage may result in the corresponding utterance being tagged with $C_5$ and, so on and so forth.

In one embodiment, the mapping of each utterance in a conversation to a workflow stage results in extraction of a workflow associated with the conversation. More specifically, the automatic encoding of utterances and the mapping of the encoded utterances to workflow stages results in tagging of each utterance in a conversation to a workflow stage, thereby facilitating extraction of the workflow. Further, an assigning of the cluster number to each workflow stage and subsequent mapping of the encoded utterances to the workflow stages is configured to represent the workflow of the respective conversation as a sequence of cluster numbers. In a simplified illustrative example, if a conversation includes three utterances, which are mapped to workflow stages 'greetings', 'information extraction' and 'end of chat', which in turn are associated with cluster numbers $C_1$, $C_5$ and $C_8$, respectively, then in such a case, the extracted workflow may be represented by the sequence of cluster numbers: $C_1$, $C_5$ and $C_8$. Thus, as explained above, the workflow may be extracted automatically in the form of sequence of cluster numbers, which is indicative of a sequence of workflow stages involved in the conversation. This sequence of workflow stages in turn configures the workflow of the respective conversation.

As explained above, in some embodiments, the processor 302 may be configured to perform the mapping of encoded utterances to workflow stages only for those utterances in the conversation that are associated with the agent. More specifically, only those utterances that correspond to agent's responses in the conversational transcript may be subjected to encoding and subsequent mapping to a cluster. Typically, the customers may provide utterances in various forms and the agent, upon correctly identifying the customer's concern, provides streamlined responses and thereafter drives the conversation. Accordingly, mapping the agent's responses to the workflow stages may provide a better indication of the workflow involved in the corresponding conversation. For example, if the agent has resorted to logical reasoning or fetched information from a database, then such actions may be captured in hidden state representations of the corresponding utterances and may thereafter be used to identify the workflow associated with the respective conversation. It is however noted that the mapping of utterances from the conversation to workflow stages may not be limited to only the agent utterances and that, in at least some embodiments, customer utterances or both customer and agent utterances may be mapped to workflow stages based on the respective hidden state representations.

In an embodiment, the processor 302 is configured to perform clustering on the plurality of conversations based on the similarity in extracted workflows to configure a plurality of workflow groups. In one embodiment, the clustering based on similarity in extracted workflows may be performed to generate a plurality of intent-based workflow groups. In an illustrative example, a chat conversation between an agent and a customer may include ten agent lines. Each agent line may then be passed to an encoder, such as the RNN encoder, and their respective hidden state representations generated. Each hidden state representation may be mapped to a workflow stage using a mapping logic as explained above, to generate a sequence of cluster numbers (for example, ten cluster numbers for ten agent lines).

The processor 302 may generate such cluster number sequence representations for several conversations and perform a sequence clustering to identify conversations, which are similar to each other, or more specifically have similar workflow. In an embodiment, the processor 302 may use stored algorithms in the memory 304, such as for example, any sequence clustering algorithms involving any of the following dissimilarity measures such as optimal matching, longest common subsequence, longest common prefix, hamming distance etc. to identify conversations with similar workflows. In some embodiments, the clustering may also be performed using RNN approach described above where training will be performed using the same input and output sequence (i.e. auto-encoder) where the input (and output) sequence is a sequence of utterance cluster symbols (as obtained in the previous step).

Clustering or categorizing conversations with similar workflows provides several advantages as a conversational agent may then be trained to handle all conversation with one or more particular types of workflow. For example, the set of conversations categorized in one workflow group may be used to train an RNN model to predict a previous utterance or a subsequent utterance. For example, using the utterances in the set of conversations included within the workflow group, the RNN model may be trained to predict a previous agent utterance or a subsequent agent utterance for a given customer utterance input to the RNN model. In another illustrative example, using the utterances in the set of conversations included within the workflow group, the RNN model may be trained to predict a previous customer utterance or a subsequent customer utterance for a given agent utterance input to the RNN model. Such training of the RNN models enables effective training of the conversational agent. For example, as the conversational agent is now aware of the workflow involved, or more specifically is aware whether a particular conversation may require logical reasoning or require fetching of information from a database, the conversational agent (for example, an automated conversational agent or a freshly recruited live agent) can be trained to handle such conversations. The responses provided by the conversational agent may then be more streamlined and accurate and involvement of live agents in overriding agent responses may be drastically reduced.

In one embodiment, the processor 302 receives a request for an agent interaction, i.e. a request for conversation with an agent of an enterprise. The request may be provided by a customer on an enterprise interaction channel. An example provisioning of the request for agent interaction on the Web interaction channel by a customer was explained in FIG. 1. More specifically, the customer may click on a widget or a hyperlink displayed on the Website to provision a request for agent interaction.

In response to the receipt of the request, the processor 302 using text-mining or intent prediction algorithms stored in the memory 304 may be configured to predict a type of workflow associated with the requested agent interaction. As explained with reference to FIG. 3, profile and journey data may be collected for each customer visiting one or more enterprise interaction channels. For example, a customer activity on the Website or on a native mobile application may be tracked and such collected information may be used to predict a type of conversational workflow, that may result from the customer's interaction with an agent. In an illustrative example, if a customer is surfing for options to pay a bill using a digital wallet account and then requests an agent interaction, then it is highly probable that the customer may seek agent help in bill payment. Accordingly, a workflow associated with bill payment type of conversations may be relevant to the requested interaction. The processor 302 in such a case may predict a workflow of bill payment type, which may involve workflow stages such as 'greetings', 'information extraction', 'information passing' and 'end of chat'. Further, such an interaction may preclude logical reasoning but may involve fetching of information from a back-end database as part of the 'information passing' workflow stage.

Subsequent to the prediction of the type of workflow associated with the requested agent interaction, the processor 302 may assign an agent trained using the set of conversations associated with a workflow group related to the predicted type of workflow to engage with the customer.

The automatic extraction of workflows and the subsequent training of the conversational agents is further explained with reference to FIG. 4.

Figure 4:
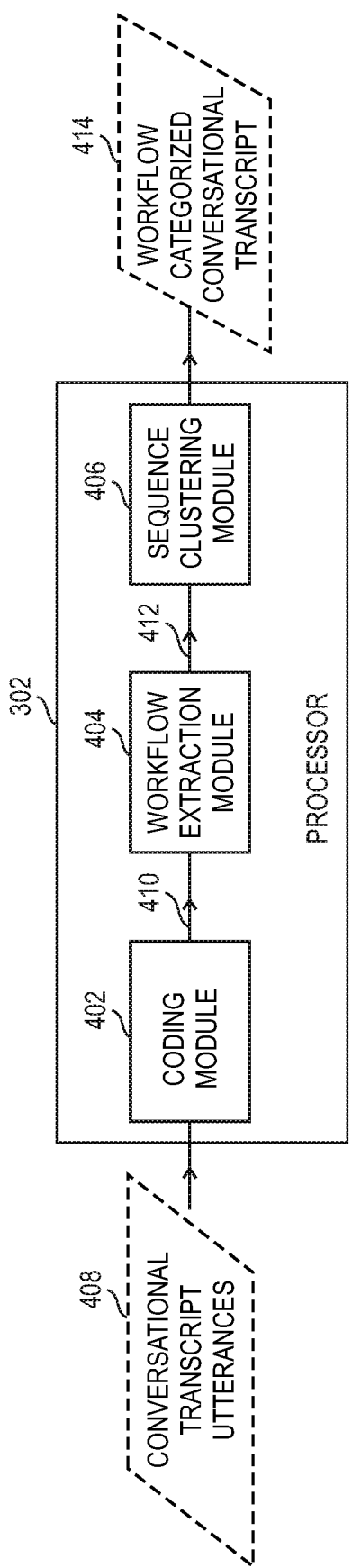
FIG. 4 is a block diagram representation showing a plurality of modules configuring the processor of the apparatus of FIG. 2, in accordance with an embodiment of the invention.

FIG. 4 is a block diagram representation showing a plurality of modules configuring the processor 302 of the apparatus 200 (shown in FIG. 3), in accordance with an embodiment of the invention. The processor 302 is depicted to include a coding module 402, a workflow extraction module 404 and a sequence clustering module 406. It is noted that the modules are depicted herein for illustration purposes and that in some embodiments the processor 302 may be configured to perform the functions as described with reference to FIG. 3 while precluding the accomplishment of tasks by individual modules as will be explained hereinafter.

In an embodiment, the coding module 402 includes an encoder and a decoder. The encoder and the decoder may be embodied as an RNN based codec. The coding module 402 is configured to receive conversational transcript utterances 408, such as for example agent utterances, customer utterances or both and encode the utterances to generate a hidden state representation for each utterance. The conversational transcript utterances 408 are hereinafter referred to as 'conversational utterances 408'.

The output of the coding module 402 upon encoding each utterance is a hidden state representation of the encoder, embodied as a vector of user-defined length (for example, a numerical value of 100 or 200 length). The output is represented by a pointed arrow 410 and is provisioned to the workflow extraction module 404.

The workflow extraction module 404 is configured to map the hidden state representation of each utterance to a workflow stage from among a plurality of workflow stages. The mapping may be performed using a mapping logic as explained with reference to FIG. 3. More specifically, as explained with reference to FIG. 3, several workflow stages, like 'information extraction', 'information passing', 'disambiguation', 'greetings', etc., may be defined and each workflow stage may be associated with a cluster number. The workflow extraction module 404 may be configured to match the hidden state representation for each utterance with characteristic sequences for each workflow stage and identify a matching workflow stage. The cluster number of the matching workflow stage may then be tagged to the utterance for mapping the utterance. The output of the workflow extraction module 404, represented by a pointed arrow 412, may be provisioned to the sequence clustering module 406. More specifically, a sequence of cluster numbers representing each conversation may be provided to the sequence clustering module 406, which may then be configured to perform a sequence clustering operation of the sequence of cluster numbers to categorize (i.e. cluster) the conversations. More specifically, conversations associated with substantially similar sequence of cluster numbers may be categorized to be similar in workflow. The output of the sequence clustering module 406 is depicted to be a workflow categorized conversational transcript 414. More specifically, the conversational transcript utterances 408 provided to the processor 302 may be analyzed by the various modules of the processor 302 to eventually categorize the conversational transcript into one of several workflows. Such automatic classification of conversational transcripts precludes tedious manual interpretation of each utterance of several conversational transcripts for identifying conversational transcripts with similar workflows. Moreover, the data generated using such an automatic categorization process may then be used for machine learning and training of conversational agents to handle customer chat interactions for dedicated workflow types. The training of the conversational agents is further explained with reference to an example conversation in FIGS. 5 to 9.

FIG. 5 shows a textual representation of an example turn-based conversation 500 between a conversational agent and a customer for illustrating an automatic extraction of a workflow, in accordance with an embodiment of the invention. The conversational agent may be embodied as a live agent or an automated agent (i.e. a chatbot). The conversational agent is hereinafter referred to as 'agent' and the turn-based conversation 500 is hereinafter referred to as 'conversation 500'.

The agent's conversational inputs are depicted to be associated with a label 'Agent' in the conversation 500, whereas the customer's conversational inputs are depicted to be associated with a label 'John' for illustration purposes. Further, only the utterances from the agent in the conversation 500 are chosen for extraction of workflow in this illustrative example. As explained with reference to FIG. 3, any combination of utterances, for example only customer utterances, all agent and customer utterances, select utterances from agents or customers, etc., may be selected for automatic extraction of the workflow for the respective conversation.

As can be seen in FIG. 5, the customer 'John' initiates the conversation 500 at 502 with a greeting. The agent 'Agent' is depicted to have responded with an utterance 'HI JOHN, HOW CAN I HELP YOU TODAY?' at 504. The customer 'John' proceeds to ask, 'WHEN IS MY CONTRACT EXPIRING?' at 506 to the agent. The agent 'Agent' is depicted to have responded with an utterance 'SURE I CAN HELP YOU WITH THAT. PLEASE PROVIDE YOUR PHONE NUMBER?' at 508.

Further, as the conversation 500 progresses, the customer 'John' is depicted to have asked if he can renew the contract using a digital wallet account at 510. In response to such a query, the agent 'Agent' is depicted to have responded with an utterance 'YES. DO YOU WANT TO USE YOUR ABC DIGITAL WALLET ACCOUNT FOR RENEWING THE CONTRACT?' at 512. After the customer 'John' has been successfully assisted in renewing the contract, the agent 'Agent' may proceed to close the conversation 500 with an utterance 'THANK YOU JOHN FOR CHOOSING TO RENEW YOUR CONTRACT WITH XYZ. GOOD DAY!' at 514.

As explained with reference to FIGS. 3 and 4, the processor 302 of the apparatus 200 (shown in FIG. 3) may be configured to receive the transcript corresponding to the conversation 500 for extraction of the workflow corresponding to the conversation 500 between 'John' and the agent of the enterprise. The user of the apparatus 200 may have selected a configuration to encode only agent utterances in the conversations while extracting corresponding workflows. Accordingly, the processor 302 may select only agent utterances in the conversation 500 for encoding purposes. In an illustrative example, the processor 302 may select utterances at 504, 508, 512 and 514 for workflow extraction purposes. Accordingly, the processor 302 may provision each utterance to an RNN encoder one word at a time, to generate a hidden state representation corresponding to each of the utterances 504, 508, 512 and 514. As explained with reference to FIG. 3, each hidden state representation may be embodied as a vector value of predefined length. The vector value of each hidden state representation may be compared with vector values associated with predefined workflow stages to map each utterance to a workflow stage. In an illustrative example, workflows stages such as 'information extraction', 'information passing', 'disambiguation', 'greetings', 'end of chat', and the like, may be predefined. Further, each of these workflow stages may be associated with one or more vector values corresponding to standard utterances exchanged in the respective workflow stages. The processor 302 of the apparatus 200 may be configured to compute a distance metric between vector values of hidden state representation corresponding to each of the utterances 504, 508, 512 and 514, and, the vector values associated with the predefined workflow stages to identify a match. The matching vector values may be paired to map each utterance to a workflow stage. In an illustrative example, the utterance 504 may be mapped to a 'greetings' workflow stage, the utterance 508 may be mapped to 'information extraction' workflow stage, the utterance 512 may be mapped to 'disambiguation' workflow stage, and the utterance 514 may be mapped to 'end of chat' workflow stage. Further, in an illustrative example, the workflow stages 'information extraction', 'information passing', 'disambiguation', 'greetings', 'end of chat' may be associated with cluster numbers 3, 5, 4, 1 and 9, respectively. Accordingly, the utterances 504, 508, 512 and 514 may be tagged with cluster numbers 1, 3, 4 and 9, respectively. The sequence of cluster numbers 1, 3, 4 and 9 are indicative of the sequence of actions executed during the conversation 500 and as such represent the workflow correspond to the conversation 500. More specifically, a workflow associated with renewal of contract may involve workflow stages, such as greetings, information extraction, disambiguation and end of chat.

Further, as explained with reference to FIGS. 3 and 4, the processor 302 may be configured to automatically extract workflows for a plurality of conversations. More specifically, each conversation may be associated with a respective sequence of cluster numbers. The processor 302 may then perform a sequence clustering to group conversations with similar workflows. The clustering of the sequence numbers may result in generating a plurality of intent-based workflow groups. For example, the conversation 500 may be categorized along with several other such conversations in a workflow group associated with contracts and queries related to contracts, such as renewal-based queries. All the conversations in a workflow group, also referred to herein as a set of conversations, may then be used to train conversational agents in customer engagement. For example, all utterances for a particular workflow type may be used to train a model, so as to facilitate prediction of responses. In an illustrative example, an RNN based model may be trained to predict for a given utterance, a previous utterance and a next utterance in the conversational transcript. As explained above, each utterance in a conversational transcript may be represented by a hidden state representation of the encoder, i.e. by a vector associated with a user-defined length. Such a vector when provided to a trained model embodied as a decoder, for example an RNN decoder in the coding module 402 (shown in FIG. 4), may result in the prediction of the previous utterance in the conversation or the next utterance or both as exemplarily explained with reference to FIGS. 6 to 8.

Figure 6:
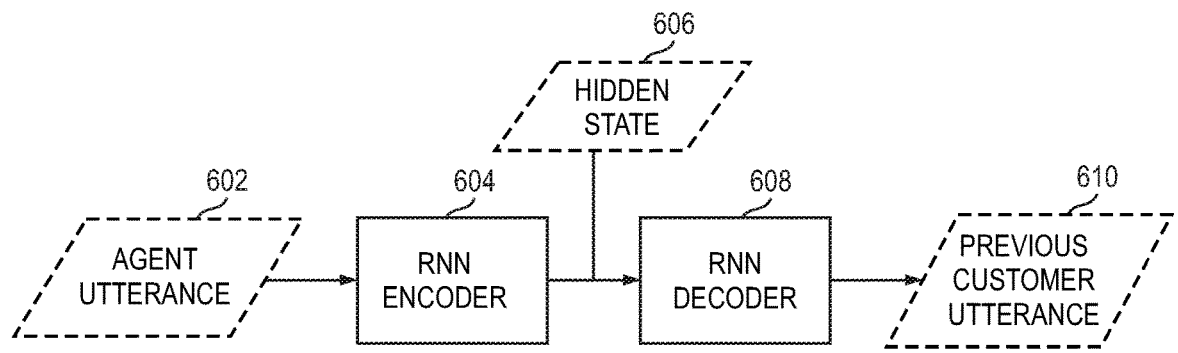
FIGS. 6, 7 and 8 depict block diagrams to illustrate an example training of the conversational agents, in accordance with an embodiment of the invention.
Figure 7:
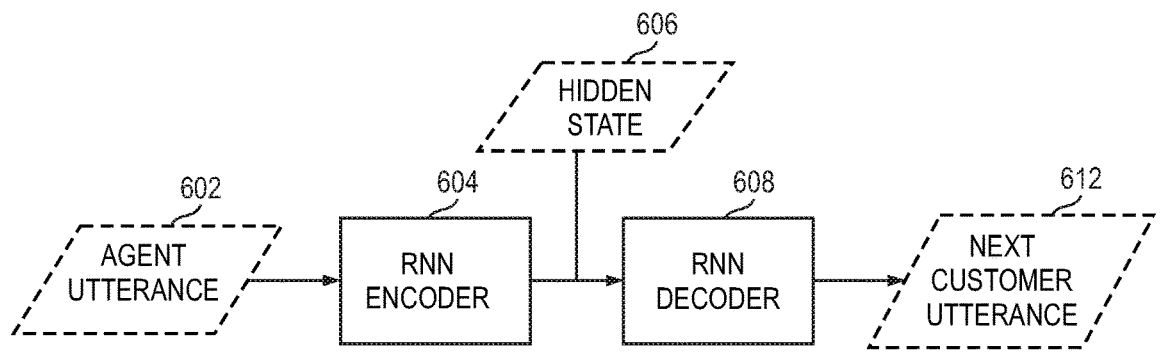
Figure 8:
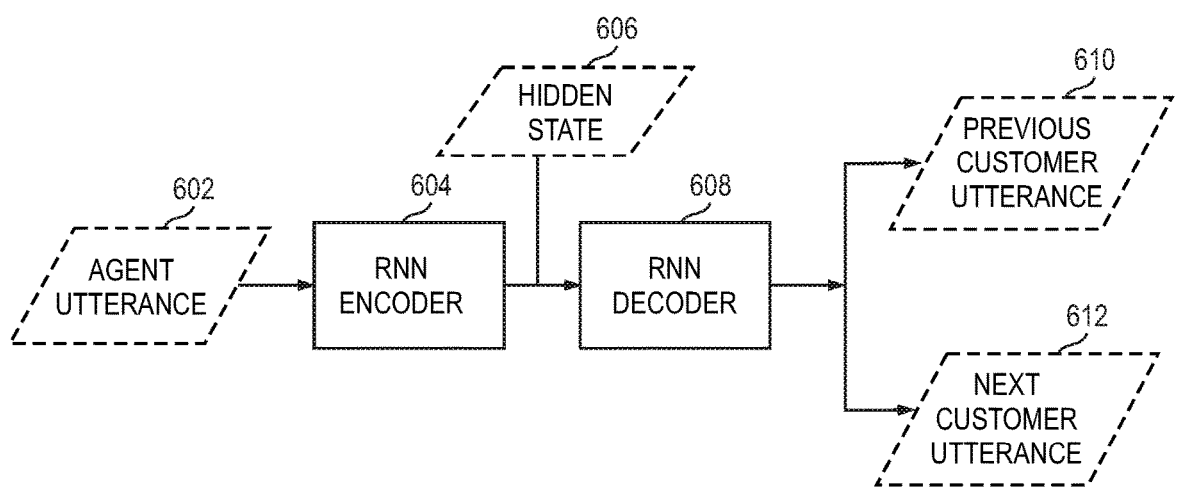

Referring now to FIGS. 6 to 8, block diagrams are depicted to illustrate an example training of the conversational agents, in accordance with an embodiment of the invention. More specifically, FIG. 6 depicts a provisioning of an agent utterance 602 to an RNN encoder 604 resulting in an output corresponding to the hidden state representation of the encoder, depicted as a hidden state 606. The hidden state 606 may be provided as an input to the RNN decoder 608. The RNN decoder 608 may be trained using machine learning algorithms and datasets corresponding to set of conversations with similar workflows to predict a previous customer utterance 610. As the hidden state 606 captures the context of the utterance in the conversation, the RNN decoder 608 may be trained to decode the context and predict the previous customer utterance 610, which resulted in the agent utterance 602.

Similarly, the RNN decoder 608 may be trained to predict a next customer utterance as exemplarily depicted in FIG. 7. More specifically, upon receiving the hidden state 606 capturing the context of the agent utterance 602, the RNN decoder 608 may be trained to decode the context and predict a next customer utterance 612. In some embodiments, the RNN decoder 608 may be trained to predict both the previous customer utterance 610 and the next customer utterance 612 as exemplarily depicted in FIG. 8. It is noted that training of the RNN model may not be limited to decoding context in agent utterances. In at least some example embodiments, the RNN decoder 608 may be trained to decode the context in a hidden state representing a customer utterance and predict the previous agent utterance that resulted in such a customer utterance as well as the next agent utterance that may result from the provisioning of such a customer utterance. The trained model embodied as the RNN encoder 604 and the RNN decoder 608 may, in effect, configure a chatbot, which is capable of decoding the context of each utterance from a customer and respond appropriately. Accordingly, several such chatbots may be trained by automatically extracting workflows and training the models based on the extracted workflows to predict and respond to customer utterances appropriately. It is noted that the datasets created by categorizing conversations with similar workflows may also enable training of live agents, especially new recruits, in customer engagement. It is noted that the term 'customer engagement' as used throughout the description implies interactions with the customers with an aim to provide desired assistance to the customers. An example response to a customer query generated by a trained chatbot, is shown in FIG. 9.

Figure 9:
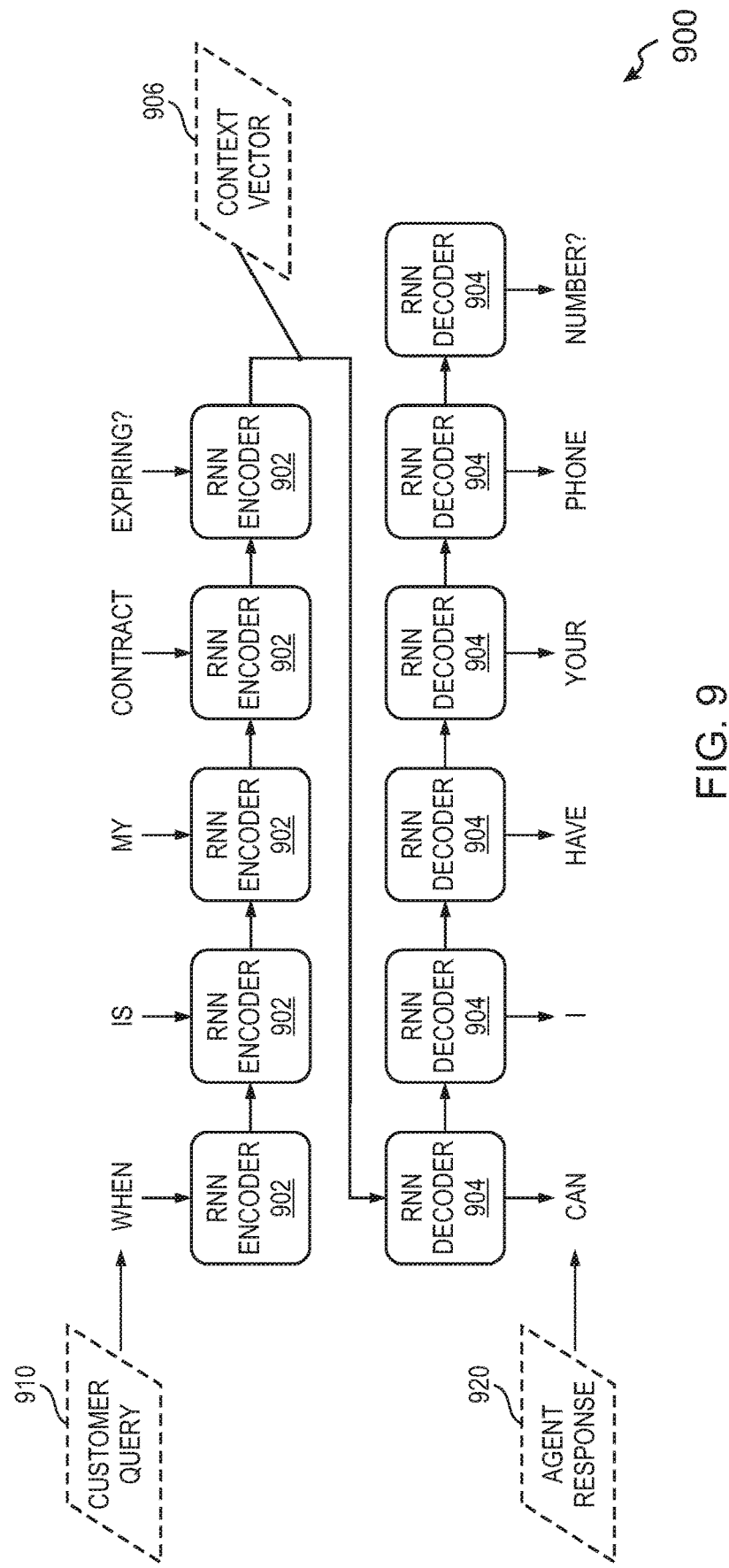
FIG. 9 shows a block diagram representation for illustrating a generation of a sequential output of words configuring the conversational agent response in response to a customer query, in accordance with an embodiment of the invention.

FIG. 9 shows a block diagram representation 900 for illustrating generation of a sequential output of words configuring the conversational agent response in response to a customer query, in accordance with an embodiment of the invention.

As explained with reference to FIGS. 6 to 8, the processor 302 of the apparatus 200 (shown in FIG. 3) may use the set of conversations associated with individual workflow groups to train conversational agents. More specifically, an RNN model including an encoding logic and a decoding logic may be trained using the set of conversations to predict utterances and thereby respond appropriately to customer queries.

The encoding logic of the RNN model is used to encode, or in other words, generate a vector (for example, a numerical value of fixed length) for each word sequentially fed to the encoding logic, whereas the decoding logic is used to decode, or in other words, generate a word response (more specifically, a numerical vector representing a probability distribution over the vocabulary) for each word sequentially fed to the decoding logic.

The encoding logic of the RNN model is exemplarily represented using block 902, referred to hereinafter as 'RNN Encoder 902', whereas the decoding logic is exemplarily represented using block 904, referred to hereinafter as 'RNN Decoder 904'. As can be seen the words of a customer query 910, i.e. words 'When', 'is', 'my', 'contract' and 'expiring' are sequentially provided to the RNN encoder 902.

It is noted that the multiple RNN encoders are shown to be arranged in a pipeline manner for illustration purposes. Only one RNN encoder 902 typically receives the words one after another. After each word passes through the RNN encoder 902, a vector is generated. The vector or the numerical value is indicative of the state of the RNN representing all words that have been provided to the RNN encoder 902 so far. The next word changes the state of the RNN, which corresponds to another vector. When all the words in the customer query 910 are sequentially provided to the RNN encoder 902, the final output which is shown as a 'context vector 906' represents the state of the RNN encoder 902 upon being sequentially provided all the words in the customer query 910.

As shown, the context vector 906 is then provided the RNN decoder 904, which provides a vector representation configuring the first word of the conversational agent response, shown as 'Can'. The word is provisioned to the RNN decoder 904 to generate the second word 'I' and so on and so forth to generate the sequential output of words configuring the conversational agent response 920: 'Can I have your phone number?' The response is then provisioned to the conversational agent, which may then provision the response to the customer.

Figure 10:
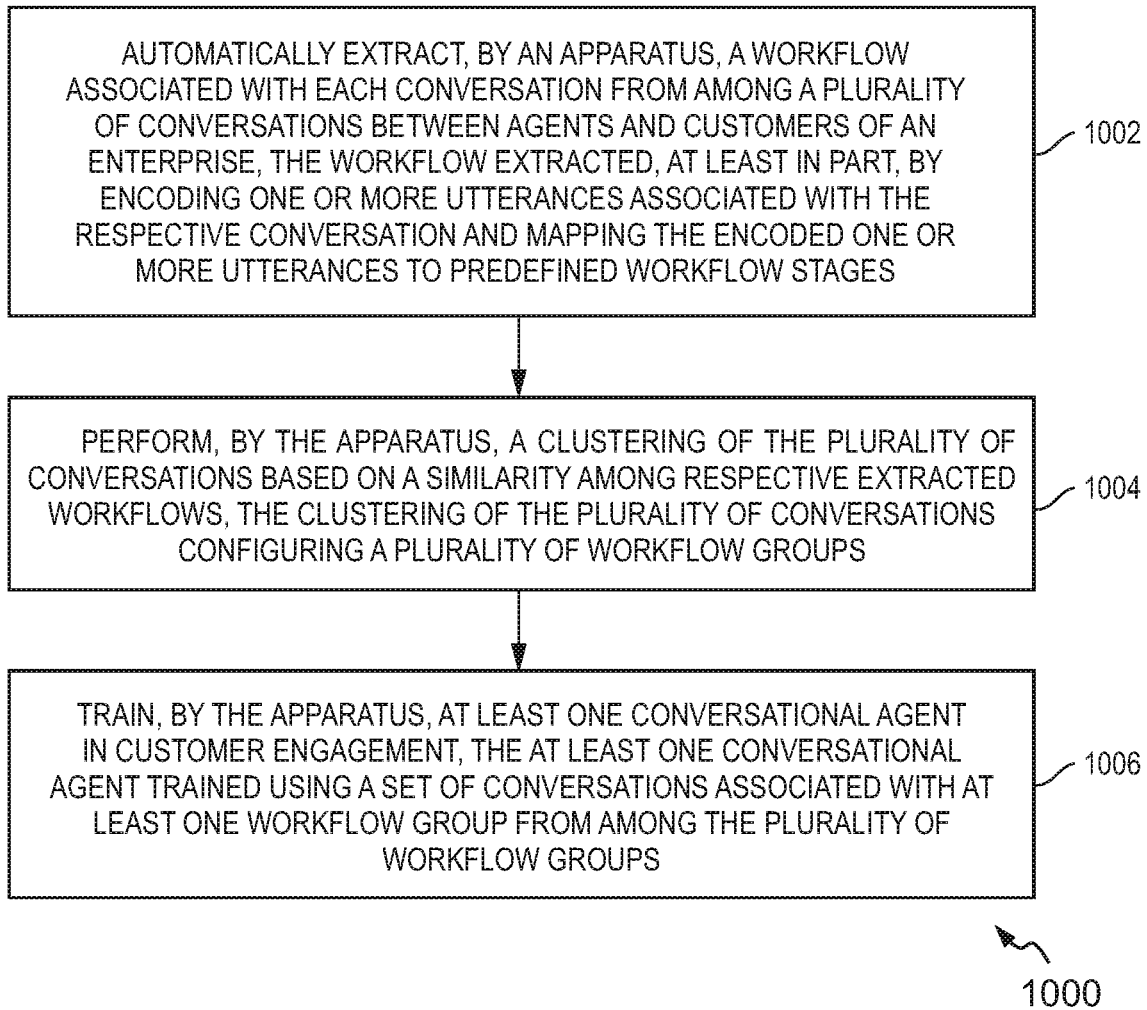
FIG. 10 is a flow diagram of an example method for facilitating training of conversational agents, in accordance with an embodiment of the invention.

FIG. 10 is a flow diagram of an example method 1000 for facilitating training of conversational agents, in accordance with an embodiment of the invention. The method 1000 depicted in the flow diagram may be executed by, for example, the apparatus 200 explained with reference to FIGS. 2 to 9. Operations of the flowchart, and combinations of operation in the flowchart, may be implemented by, for example, hardware, firmware, a processor, circuitry and/or a different device associated with the execution of software that includes one or more computer program instructions. The operations of the method 1000 are described herein with help of the apparatus 200. It is noted that, the operations of the method 1000 can be described and/or practiced by using a system other than the apparatus 200. The method 1000 starts at operation 1002.

At operation 1002 of the method 1000, a workflow associated with each conversation from among a plurality of conversations between agents and customers of an enterprise is automatically extracted by an apparatus, such as the apparatus 200 explained with reference to FIGS. 2 to 9. As explained with reference to FIG. 3, the term 'conversation' as used herein implies a chat interaction or a voice interaction between a conversational agent and a customer of the enterprise. The conversational agent may be a live agent (i.e. a human agent) or an automated agent (for example, a chatbot or an IVR system). As explained with reference to FIG. 1, the customers may seek interaction with agents for several reasons. The interactions (i.e. conversations)

between the agents and the customers may be conducted over a chat medium or a voice medium. The content of the conversation may be transcribed to generate transcripts (i.e. textual form of content). Accordingly, a plurality of transcripts may be generated corresponding to a plurality of conversations between agents and customers of an enterprise.

Each conversation from among the plurality of conversations may be associated with a sequence of actions. For example, the conversation may include a greeting stage, a stage where the agent requests information from the customer, a stage where the agent fetches information from a database, and the like. These stages (or steps/actions) associated with a conversation are referred to herein as 'workflow stages' and taken together may configure a 'workflow' associated with the respective conversation. In at least one embodiment, the processor 302 is configured to automatically extract a workflow associated with each conversation from among the plurality of conversations. In one embodiment, the workflow is automatically extracted, at least in part, by encoding one or more utterances associated with the respective conversation and mapping the encoded one or more utterances to predefined workflow stages. The automatic extraction of the workflow may be performed as explained with reference to FIGS. 3 to 8 and is not explained again herein.

At operation 1004 of the method 1000, a clustering of the plurality of conversations is performed by the apparatus based on a similarity among respective extracted workflows. The clustering of the conversations configures a plurality of workflow groups. More specifically, all conversations with substantially similar workflows may be grouped together to workflow groups. The clustering of the conversations based on a similarity of extracted workflows may configure a plurality of workflow groups.

In an embodiment, the apparatus may use stored algorithms such as for example, any sequence clustering algorithms involving any of the following dissimilarity measures such as optimal matching, longest common subsequence, longest common prefix, hamming distance etc., to identify conversations with similar workflows. In some embodiments, the clustering may also be performed using an RNN approach.

At operation 1006 of the method 1000, at least one conversational agent is trained in customer engagement by the apparatus. The at least one conversational agent is trained using a set of conversations associated with at least one workflow group from among the plurality of workflow groups. More specifically, the set of conversations in a workflow group, i.e. conversations having substantially similar workflow, may be used to train conversational agents. For example, using the utterances in the set of conversations included within the workflow group, the RNN model may be trained to predict a previous agent utterance or a subsequent agent utterance for a given customer utterance input to the RNN model. In another illustrative example, using the utterances in the set of conversations included within the workflow group, the RNN model may be trained to predict a previous customer utterance or a subsequent customer utterance for a given agent utterance input to the RNN model. Such training of the RNN models enables effective training of the conversational agent. For example, as the conversational agent is now aware of the workflow involved, or more specifically is aware whether a particular conversation may require logical reasoning or require fetching of information from a database, the conversational agent (for example, an automated conversational agent or a freshly recruited live agent) can be trained to handle such conversations. The responses provided by the conversational agent may then be more streamlined and accurate and involvement of live agents in overriding agent responses may be drastically reduced. The training of the conversational agents is explained with reference to FIGS. 6 to 9 and is not explained again herein.

Without in any way limiting the scope, interpretation, or application of the claims appearing below, advantages of one or more of the exemplary embodiments disclosed herein provide numerous advantages. The techniques disclosed herein suggest mechanisms for training of conversational agents, and especially automated conversational agents (for example, chatbots). A sequence of actions or workflows is automatically extracted from chat transcripts and used for training the automated conversational agents. The extraction of workflows enables training of the automated conversational agents to handle customer assistance requests in specific areas, thereby improving a quality of assistance provided to the customers. Such training of conversational agents may enable the conversational agents to specialize in one type of chat conversations and anticipate all types of customer requests that are similar in nature. As a result, the conversational agents may be trained to effectively handle customer requests in one or more chosen domains, and such training of conversational agents precludes the need to manually analyze each sentence and review a large pool of conversations to train the conversational agents.

Moreover, the data sets created on account of extraction of workflows may enable machine-learning algorithms to better learn the sequence of actions in conversations and improve an effectiveness of responses provided to the customer. Furthermore, as the quality of responses improves, the involvement of the live agents monitoring the interactions of the automated conversational agents is also reduced. The training of conversational agents is performed in an automated manner while precluding manual interpretation of responses, thereby greatly improving an efficiency of training the automated conversational agents.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution apparatus, as described and depicted in FIGS. 3 and 4. A computer-readable medium may include a computer-readable storage medium that may be any media or means that can contain or store the instructions for use by or in connection with an instruction execution system, system, or device, such as a computer.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 302 and its various components, the memory 304, the I/O module 306 and the communication module 308 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIG. 10). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:
1. A computer-implemented method comprising:
automatically extracting, by an apparatus; a workflow associated with each conversation from among a plurality of conversations between agents and customers of an enterprise, the workflow extracted, at least in part, by encoding one or more utterances associated with the respective conversation and mapping the encoded one or more utterances to predefined workflow stages;
receiving, by the apparatus, a transcript corresponding to each conversation from among the plurality of conversations, the transcript comprising a plurality of utterances exchanged between a conversational agent and a customer engaged in a conversation; for each transcript, encoding, by the apparatus, each utterance from at least one of the conversational agent and the customer to generate a hidden state representation corresponding to each utterance, wherein the hidden state representation of each utterance is configured to retain at least a part of a context of the respective utterance;
wherein each workflow stage from among the predefined workflow stages is associated with a cluster number and, wherein the hidden state representation associated with each utterance is mapped to a workflow stage from among the predefined workflow stages; and
wherein the mapping of the hidden state representation to the workflow stage is configured to assign a corresponding cluster number to the hidden state representation and, wherein the assigning of the cluster number to the hidden state representation of each utterance is configured to represent the workflow of the respective conversation as a sequence of cluster numbers;
performing, by the apparatus, a clustering of the plurality of conversations based on a similarity among respective extracted workflows, the clustering of the plurality of conversations configuring a plurality of workflow groups;
and
training, by the apparatus, at least one conversational agent in customer engagement, the at least one conversational agent trained using a set of conversations associated with at least one workflow group from among the plurality of workflow groups.

2. The method as claimed in claim 1, wherein the each utterance is encoded using an Recurrent Neural Network (RNN) encoder and, wherein the hidden state representation corresponds to a vector representation of a predefined length.

3. The method as claimed in claim 1, wherein the similarity among the extracted workflows is identified by performing sequence clustering of the sequence of cluster numbers representing the workflow of each conversation.

4. The method as claimed in claim 1, wherein the training of the at least one conversational agent comprises training a Recurrent Neural Network (RNN) based learning model to predict for each customer utterance, at least one of a previous conversational agent utterance and a subsequent conversational agent utterance.

5. The method as claimed in claim 1, wherein the training of the at least one conversational agent comprises training a Recurrent Neural Network (RNN) based learning model to predict for each conversational agent utterance, at least one of a previous customer utterance and a subsequent customer utterance.

6. The method as claimed in claim 1, wherein each conversation corresponds to one of a chat interaction and a voice interaction between a conversational agent and a customer of the enterprise and, wherein the conversational agent is one of a live agent and a virtual agent.

7. The method as claimed in claim 1, further comprising:
receiving, by the apparatus, a request for an agent interaction, the request provided by a customer on an enterprise interaction channel;
predicting, by the apparatus, a type of workflow associated with the requested agent interaction; and
assigning, by the apparatus, a conversational agent from among the trained at least one conversational agent to engage with the customer, the conversational agent trained using the set of conversations associated with a workflow group related to the predicted type of workflow.

8. The method as claimed in claim 1, wherein the one or more utterances correspond to one of:
conversational agent utterances in the respective conversation;
customer utterances in the respective conversation; and
utterances from a conversational agent and a customer in the respective conversation.

9. An apparatus comprising:
a memory for storing instructions; and
a processor configured to execute the instructions and thereby cause the apparatus to perform at least:
receive a transcript corresponding to each conversation from among the plurality of conversations, the transcript comprising a plurality of utterances exchanged between a conversational agent and a customer engaged in a conversation;
for each transcript, encode each utterance from at least one of the conversational agent and the customer to generate a hidden state representation corresponding to each utterance, wherein the hidden state representation of each utterance is configured to retain at least a part of a context of the respective utterance;
wherein each workflow stage from among the predefined workflow stages is associated with a cluster number and, wherein the hidden state representation associated with each utterance is mapped to a workflow stage from among the predefined workflow stages; and
wherein the mapping of the hidden state representation to the workflow stage is configured to assign a corresponding cluster number to the hidden state representation and, wherein the assigning of the cluster number to the hidden state representation of each utterance is configured to represent the workflow of the respective conversation as a sequence of cluster numbers;
automatically extract a workflow associated with each conversation from among a plurality of conversations between agents and customers of an enterprise, the workflow extracted, at least in part, by encoding one or more utterances associated with the respective conversation and mapping the encoded one or more utterances to predefined workflow stages;
perform a clustering of the plurality of conversations based on a similarity among respective extracted workflows, the clustering of the plurality of conversations configuring a plurality of workflow groups; and
train at least one conversational agent in customer engagement, the at least one conversational agent trained using a set of conversations associated with at least one workflow group from among the plurality of workflow groups.

10. The apparatus as claimed in claim 9, wherein the similarity among the extracted workflows is identified by performing sequence clustering of the sequence of cluster numbers representing the workflow of each conversation.

11. The apparatus as claimed in claim 9, wherein the apparatus if further caused to:
receive a request for an agent interaction, the request provided by a customer on an enterprise interaction channel;
predict a type of workflow associated with the requested agent interaction; and
assign a conversational agent from among the trained at least one conversational agent to engage with the customer, the conversational agent trained using the set of conversations associated with a workflow group related to the predicted type of workflow.

12. A computer-implemented method comprising:
receiving, by an apparatus, a plurality of transcripts corresponding to a plurality of conversations between agents and customers of an enterprise, each transcript comprising a plurality of utterances exchanged between a conversational agent and a customer engaged in a conversation;
for each transcript, encoding each utterance from at least one of the conversational agent and the customer, by the apparatus, to generate a hidden state representation corresponding to the respective utterance, the hidden state representation configured to retain at least a part of a context of the respective utterance;
for each transcript, mapping the hidden state representation corresponding to each encoded utterance to a workflow stage from among predefined workflow stages by the apparatus, the mapping configured to facilitate automatic extraction of a workflow associated with each conversation from among the plurality of conversations;
wherein each workflow stage from among the predefined workflow stages is associated with a cluster number and, wherein the mapping of the hidden state representation to the workflow stage is configured to assign a corresponding cluster number to the hidden state representation, the assigning of the cluster number to the hidden state representation of each encoded utterance configured to represent the workflow of the respective conversation as a sequence of cluster numbers;
performing, by the apparatus, clustering of the plurality of conversations based on a similarity among respective extracted workflows, the clustering of the plurality of conversations configuring a plurality of workflow groups; and
training, by the apparatus, at least one conversational agent in customer engagement, the at least one conversational agent trained using a set of conversations associated with at least one workflow group from among the plurality of workflow groups.

13. The method as claimed in claim 12, wherein the similarity among the extracted workflows is identified by performing a sequence clustering of the sequence of cluster numbers representing the workflow of each conversation.

* * * * *